United States Patent
Krishnamurthy et al.

(10) Patent No.: US 12,353,271 B2
(45) Date of Patent: *Jul. 8, 2025

(54) ERROR RATE INTERRUPTS IN HARDWARE FOR HIGH-SPEED SIGNALING INTERCONNECT

(71) Applicant: NVIDIA Corporation, Santa Clara, CA (US)

(72) Inventors: Adithya Hrudhayan Krishnamurthy, Sunnyvale, CA (US); Ish Chadha, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/526,621

(22) Filed: Dec. 1, 2023

(65) Prior Publication Data

US 2024/0103951 A1  Mar. 28, 2024

Related U.S. Application Data

(63) Continuation of application No. 17/557,836, filed on Dec. 21, 2021, now Pat. No. 11,880,265.

(51) Int. Cl.
*G06F 11/07* (2006.01)
*G06F 11/16* (2006.01)

(52) U.S. Cl.
CPC ........ *G06F 11/076* (2013.01); *G06F 11/0745* (2013.01); *G06F 11/0757* (2013.01); *G06F 11/0772* (2013.01); *G06F 11/1679* (2013.01)

(58) Field of Classification Search
CPC ............... G06F 11/076; G06F 11/0745; G06F 11/0757; G06F 11/0772; G06F 11/1679; H04L 1/0036

(Continued)

(56) References Cited

U.S. PATENT DOCUMENTS

| 4,099,668 A | * | 7/1978 | Feilchenfeld | ...... | G01R 31/2834 |
| | | | | | 714/E11.169 |
| 6,728,216 B1 | | 4/2004 | Sterner | | |

(Continued)

FOREIGN PATENT DOCUMENTS

| CN | 1710911 A | 12/2005 |
| CN | 101404608 A | 4/2009 |
| CN | 107197365 A | 9/2017 |

OTHER PUBLICATIONS

Office Action for Chinese Patent Application No. 202211424315, mailed Apr. 16, 2025, 19 Pages.

*Primary Examiner* — James C Kerveros
(74) *Attorney, Agent, or Firm* — Lowenstein Sandler LLP

(57) ABSTRACT

A receiver device includes detection logic, error counter logic, and threshold logic. The detection detects frame errors in data frames received by a transmitter device. The error counter logic increments a first value of an error count responsive to each error signal, indicative of a frame error in a data frame, received from the detection logic. The error counter logic reduces the first value to a second value (non-zero value) for the error count responsive to receiving a decrement signal and a period marker signal corresponding to a programmable period. The error counter logic resets the first value or the second value of the error count to zero responsive to receiving a reset signal. The threshold logic compares a current value of the error count with a threshold number of frame errors and output an interrupt responsive to the current value satisfying the threshold number of frame errors.

20 Claims, 7 Drawing Sheets

(58) Field of Classification Search
USPC .......................................................... 714/48
See application file for complete search history.

(56) References Cited

U.S. PATENT DOCUMENTS

| | | | |
|---|---|---|---|
| 9,575,862 B1* | 2/2017 | Hutton | G06F 11/186 |
| 2003/0229844 A1 | 12/2003 | Bansal et al. | |
| 2005/0154797 A1 | 7/2005 | Allen et al. | |
| 2007/0088974 A1 | 4/2007 | Chandwani et al. | |
| 2014/0173368 A1* | 6/2014 | Collins | G06F 11/073 |
| | | | 714/704 |
| 2014/0237305 A1* | 8/2014 | Rehmeyer | G11C 29/40 |
| | | | 714/704 |
| 2015/0293809 A1 | 10/2015 | Liang | |
| 2016/0170819 A1 | 6/2016 | Zhou et al. | |
| 2018/0217887 A1 | 8/2018 | Rueger et al. | |
| 2019/0303227 A1 | 10/2019 | Nakamura | |
| 2020/0057686 A1 | 2/2020 | Huang et al. | |

* cited by examiner

ERROR RATE INTERRUPTS IN HARDWARE FOR HIGH-SPEED SIGNALING INTERCONNECT

RELATED APPLICATION

This application is a continuation of U.S. patent application Ser. No. 17/557,836, filed Dec. 21, 2021. The entire contents of which are incorporated by reference herein.

TECHNICAL FIELD

At least one embodiment pertains to processing resources used to perform and facilitate high-speed communications. For example, at least one embodiment pertains to technology for error rate interrupts in hardware for a high-speed interconnect—e.g., a ground-referenced signaling (GRS) interconnect.

BACKGROUND

Communication systems transmit signals from a transmitter to a receiver via a communication channel or medium (e.g., cables, printed circuit boards, links, wirelessly, etc.) In some communication systems, errors can occur when transmitting the signals from the transmitter to the receiver. For example, due to a link coupling the transmitter and receiver, errors can occur in a frame (e.g., a set of bits) transmitted from the transmitter to the receiver. In some conventional communication systems, the receiver can transmit an interrupt to a software stack if a threshold number of errors is satisfied. In such communication systems, the link can continue transmitting data stably despite the threshold number of errors being satisfied. Accordingly, in conventional communication systems, the receiver can be transmitting excessive interrupts causing increased latency and a performance reduction in the communication system.

BRIEF DESCRIPTION OF DRAWINGS

Various embodiments in accordance with the present disclosure will be described with reference to the drawings, in which.

DETAILED DESCRIPTION

Figure 1:
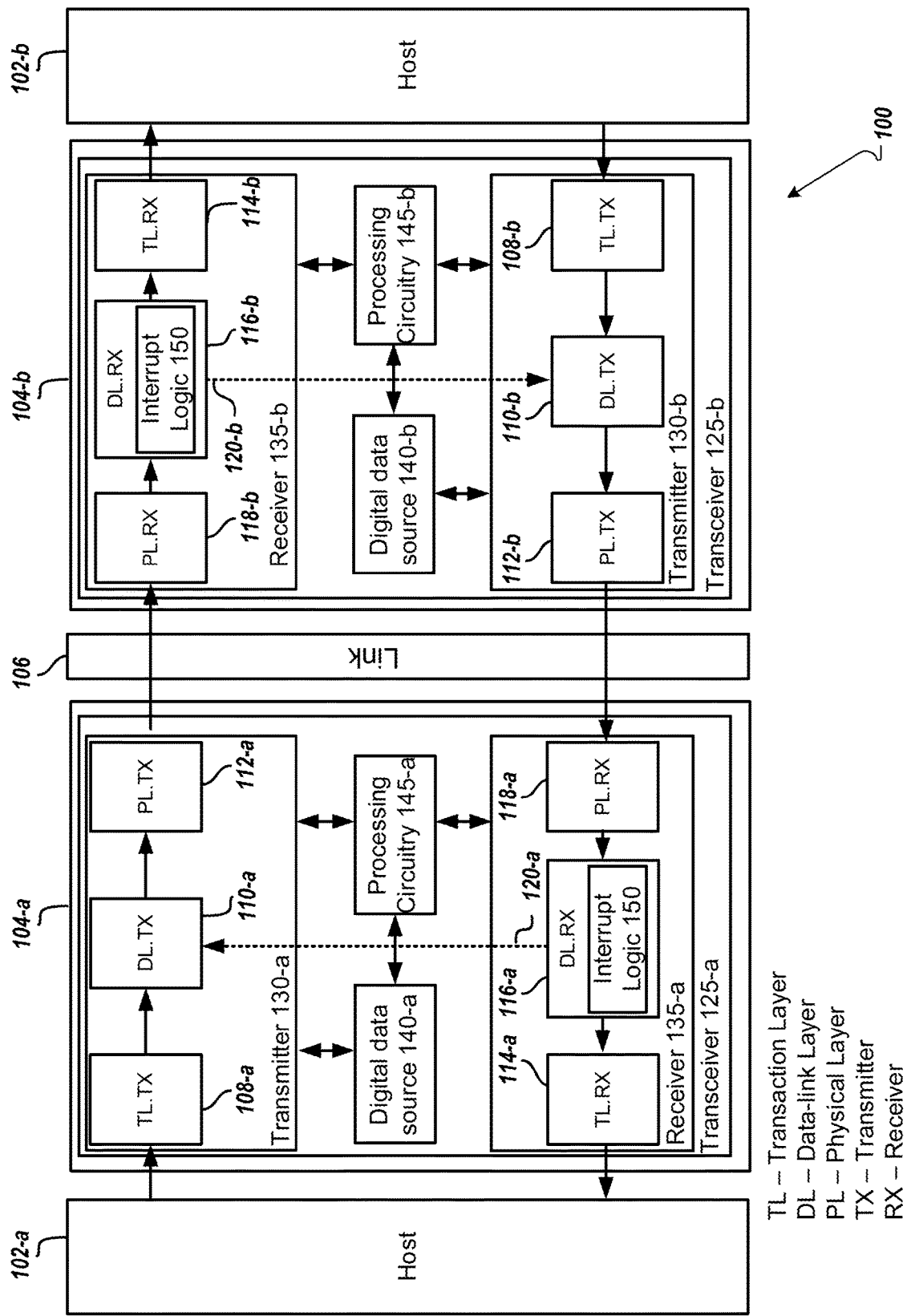
FIG. 1 is an example communication system employing a method for error rate interrupts in hardware, in accordance with at least some embodiments.

Communication systems transmit signals from a transmitter to a receiver via a communication channel or medium (e.g., cables, printed circuit boards, links, wirelessly, etc.). In some communication systems, the link can cause errors to occur when transmitting data or signals from the transmitter to the receiver. The link can be reliable within a range of acceptable errors—e.g., the link can be reliable if a number of errors that occur are within the range of acceptable errors and unreliable if the number of errors that occur is outside the range of acceptable errors. The range of acceptable errors can be determined during a manufacturing process associated with the link. In conventional communication systems, the receiver can detect the number of errors that occur and raise an interrupt to a software stack (e.g., boot or run-time software, firmware, or other entities controlling the link and hardware) associated with the receiver when the number of errors exceeds a threshold number of errors—e.g., the receiver detects the number of errors is outside the acceptable range of errors. For example, data can be communicated from the transmitter to the receiver across the link in frames of fixed lengths—e.g., each frame can include a same quantity of bits. The receiver can perform error detection operations on the frames received to determine a frame error rate (FER). The receiver can transmit an interrupt to the software stack when the frame error rate exceeds a frame error rate threshold associated with the link. In such communication systems, the software can determine whether to take an action to reduce the frame error rate based on receiving the interrupt.

In some communication systems, over a long period, the link can reliably transmit data even when exceeding the frame error rate threshold. For example, the link can continue reliably transmitting data if the frame error rate threshold is exceeded after a first period passes—e.g., the period is long enough that the software stack can determine to take no action even though the receiver indicated the interrupt. Accordingly, the receiver can transmit excessive interrupts to the software stack if the receiver raises an interrupt each time the threshold number of errors is satisfied. Excessive interrupts to the software stack can increase processing times, software overhead, and turnaround latency—e.g., processing the excessive interrupts can reduce the performance of the communication system. Additionally, as the interrupts are associated with additional processing times, the accuracy of determining the frame error rate can be reduced. For example, due to processing times, the actual number of errors detected can increase while the software stack is processing a previous interrupt, decreasing the accuracy of the processing performed by the software stack.

Advantageously, aspects of the present disclosure can address the deficiencies above and other challenges by providing a method for error rate interrupts in hardware for a high-speed interconnect. For example, the receiver can include interrupt logic that raises an interrupt if a number of errors detected satisfy a threshold number of errors within a programmable period. In such examples, a software stack (e.g., boot or run-time software, firmware, or other entities controlling the link and hardware) can program the threshold number of errors and the programmable period to the interrupt logic. In some examples, the interrupt logic can be programmed with two threshold numbers of errors. For example, the interrupt logic can be programmed with a first threshold number of errors associated with a first interrupt and a second threshold number of errors associated with a second interrupt. The first interrupt can be a soft interrupt that enables the software stack to prepare for additional errors—e.g., the software stack can slow down a speed of the link or take additional actions other than resetting or shutting down the link. The second interrupt can be a hard interrupt that causes the software stack to shut down or retrain the link.

According to embodiments, the receiver can perform error detection operations on incoming frames received from the transmitter. The interrupt logic can count a number of errors (e.g., a number of frame errors) that occur. The interrupt logic can also be coupled to a period clock that indicates when the programmable period is over. In such examples, the interrupt logic can reset or decrement the count of the number of errors (e.g., a stored value that corresponds to the number of errors) after each period is over. For example, the interrupt logic can reset the count of the number of errors to zero (0) each time the period elapses as indicated by the period clock. In other examples, the interrupt logic can reduce the count of the number of errors by a set value each time the period elapses—e.g., reduce the count of the number of errors by three (3) each time the period elapses. If the interrupt logic determines the number of errors detected satisfies the first threshold within a respective period, the interrupt logic can transmit the first interrupt to the software stack and continue detecting for additional errors. If the interrupt logic determines the number of errors detected satisfies the second threshold within the respective period, the interrupt logic can transmit the second interrupt to the software stack. Accordingly, the receiver can transmit fewer interrupts to the software stack as the interrupt is raised if the number of errors is satisfied within the programmable period.

By utilizing the interrupt logic and transmitting interrupts if the threshold number of errors is satisfied within the programmable period, the communication system can reduce processing times, turnaround latencies, and improve the overall performance of the communication system. Additionally, as the interrupt logic determines the number of errors and whether to raise an interrupt, the interrupt logic can accurately transmit interrupts to the software stack. Accordingly, embodiments of the present application allow for a more reliable method for error interrupts in a high-speed interconnect system.

FIG. 1 illustrates an example communication system 100 according to at least one example embodiment. The system 100 includes a host 102-a, a host 102-b, a first device 104-a, and a second device 104-b. The system 100 also includes a link 106 coupling the first device 104-a and the second device 104-b. Each device 104 may include a transceiver 125 that includes a transmitter 130, a receiver 135, a digital data source 140, and processing circuitry 145. Each transmitter 130 may include a transaction layer (TL) 108, a data layer (DL) 110, a physical layer (PL) 112, and each receiver 135 may include TL 114, a DL 116, and a PL 118.

In at least one example, hosts 102 or devices 104 may correspond to one or more of a Personal Computer (PC), a laptop, a tablet, a smartphone, a server, a collection of servers, or the like. In some examples, the hosts 102 may correspond to any appropriate type of device that communicates with other devices and is also connected to a common link 106. In some examples, hosts 102 may transmit commands or data to devices 104. In such examples, devices 104 may communicate data with each other based on commands or data received by the hosts 102. As another specific but non-limiting example, the hosts 102 and devices 104 may correspond to servers offering information resources, services and/or applications to user devices, client devices, or other hosts in the system 100.

In at least one example embodiment, first device 104-a and second device 104-b may be examples of chips—e.g., system 100 may be an example of a multi-chip module or a chip-to-chip (C2C) interconnect. In such examples, the devices 104 may be single chips or stacks of chips. In some examples, devices 104 may include a graphics processing unit (GPU), a switch (e.g., a high-speed network switch), a network adapter, a central processing unit (CPU), etc., to execute commands or functions received from the hosts 102. Each device 104 may include a transceiver 125 for sending and receiving signals, for example, data signals. The data signals may be digital or optical signals modulated with data or other suitable signals for carrying data. Each transceiver 125 may include a receiver 135 and a transmitter 130. The transmitter 130 includes suitable software and/or hardware for receiving digital data from the digital data source 140 and outputting data signals according to the digital data for transmission over the link 106 to a receiver 135 of device 104-b. The receiver 135-a of device 104-a and receiver 135-b of device 104-b may include suitable hardware and/or software for receiving signals, for example, data signals from the link 106.

In an embodiment, devices 104 may communicate bi-directionally—e.g., from host 102-a to host 102-b or from host 102-b to host 102-a. In some examples, each receiver 135 or transmitter 130 of devices 104 may operate independently and/or simultaneously. For example, receiver 135-a of first device 104-a may receive data from transmitter 130-b of second device 104-b simultaneous with transmitter 130-a of first device 104-a transmitting data to receiver 135-b of second device 104-b.

Each transmitter 130 and receiver 135 in devices 104 may include a transaction layer (TL). In some examples, the TL 108 of the transmitter 130 may be configured to request a transaction—e.g., request the transmission of data. For example, the TL 108 of the transmitter 130 may communicate functions or assemble data packets for other components of the devices 104. In some examples, the TL 108 of the transmitter 130 may generate a transaction layer packet (TLP) that may be transmitted to the DL 110 for further processing. In some examples, each receiver 135 in devices 104 may also include a transaction layer 114. In some examples, the TL 114 of the receiver 135 may be configured to complete a transaction—e.g., complete the transmission of data. For example, the TL 114 of the receiver 135 may receive functions from or disassemble packets received from other components of the receiver of each device 104. In some embodiments, the TL 114 of the receiver 135 may verify an incoming TLP packet to ensure the packet received is valid—e.g., without errors.

Each transmitter 130 and receiver 135 in devices 104 may also include a data layer. In some examples, the DL 110 and DL 116 may be configured to ensure data being sent across the link 106 is correct and without errors. For example, the DL 110 of the transmitter 130 may encode a respective frame or packet transmitted with an error code—e.g., a CRC value. The DL 116 of the receiver 125 may generate an error code based on the received frame and decode the CRC embedded in the frame to compare whether the generated error code matches the transmitted CRC. In some examples, the DL 116 performs the error decode operation to see if the data received is correct and without errors. In some examples, the DL 110 of the transmitter 130 may be configured to add a sequence number as a header to each frame or packet transmitted, and the DL 116 of the receiver 135 may be configured to check the sequence number as well. In some examples, the DL 110 of the transmitter 130 and DL 116 of the receiver 135 may include, or be coupled with, controllers or control flow units to perform the error decode operations on packets or frames received—e.g., the processing circuitry 145.

Additionally, each transmitter 130 and receiver 135 in devices 104 may include a physical layer (PL). In some examples, the PL 112 and PL 118 may be configured to transmit and receive data across the link 106. For example, the PL 112 and PL 118 may include input/output (I/O) buffers, parallel-to-serial and serial-to-parallel converters, impedance matching circuitry, logic circuitry, etc., to transmit and receive data packets or frames across the link 106.

Each transceiver 125 may include a digital data source 140 and processing circuitry 145 that controls the transceiver 125. The digital data generator 140 may include suitable hardware and/or software for outputting data in a digital format (e.g., in binary code and/or thermometer code). The digital data output by the digital data source 140 may be retrieved from memory (not illustrated) or generated according to input (e.g., user input).

The processing circuitry 145 may comprise software, hardware, or a combination thereof. For example, the processing circuitry 145 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 145 may comprise hardware, such as an application specific integrated circuit (ASIC). Other non-limiting examples of the processing circuitry 132 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 145 may be provided on a Printed Circuit Board (PCB) or collection of PCBs. It should be appreciated that any appropriate type of electrical component or collection of electrical components may be suitable for inclusion in the processing circuitry 145. The processing circuitry 145 may send and/or receive signals to and/or from other elements of the transceiver 125 to control an overall operation of the transceiver 125.

The transceiver 125 or selected elements of the transceiver 125 may take the form of a pluggable card or controller for the device 104. For example, the transceiver 125 or selected elements of the transceiver 125 may be implemented on a network interface card (NIC).

The link 106 may be an example of a communication network that may be used to connect the devices 104, such as an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), a peripheral component interconnect express (PCIe), variants thereof, and/or the like. In one specific, but non-limiting example, the link 106 is a network that enables data transmission between the devices 104 using data signals (e.g., digital, optical, wireless signals).

In an embodiment, link 106 may be configured to transmit requests, data, functions, commands, etc., between the first device 104-a and the second device 104-b. In one example, link 106 may be cables, printed circuit boards, links, wireless, etc. In at least one embodiment, the link 106 may be an example of a ground-referenced signaling (GRS) interconnect. In such examples, the link 106 may include RC-dominated channels and LC transmission lines. Additionally, the GRS interconnect may be an on-chip link, a link across a substrate (e.g., organic package), or link signaling over a printed circuit board (PCB). In some examples, GRS may use a ground network as a signal reference voltage—e.g., ground may be the return signaling. Although not explicitly shown, it should be appreciated that hosts 102 and devices 104 may include other processing devices, storage devices, and/or communication interfaces generally associated with computing tasks, such as sending and receiving data.

In some examples, the DL 116 of the receiver includes interrupt logic 150. In some embodiments, interrupt logic 150 can be configured to determine a number of errors that occur while receiving data. For example, interrupt logic 150 can determine a number of frame errors (e.g., a frame error rate (FER)) when receiving frames from link 106. In some embodiments, the interrupt logic can perform error detection on each incoming frame to determine the FER. In at least one embodiment, the interrupt logic can compare the number of frame errors within a programmable period with a first threshold number of frame errors and a second threshold number of frame errors—e.g., within a period specified by processing circuitry 145 or other software controlling the DL 116 of the receiver 135. In such embodiments, the first threshold number of frame errors can be associated with a first interrupt, and the second threshold number of frame errors can be associated with a second interrupt. In some embodiments, processing circuitry 145 or other software controlling the DL 116 of the receiver 135 can take remedial actions other than a reset or power down of the link 106 if the first interrupt is received (e.g., slowing down the link 106) or power down and shut down the link 106 if the second interrupt is received. The interrupt logic 150 can be configured to receive a signal from a clock not associated with the link 106 that indicates when a programmable period is over. When the period is over, the interrupt logic 150 can receive a period indication and decrease the count of the number of frame errors by a specified value or rest the count of the number of frame errors. Accordingly, the interrupt logic 150 can raise the first interrupt if the number of frame errors satisfies the first threshold number of errors within the period and/or raise the second interrupt if the number of frame errors satisfies the second threshold number of errors within the period.

Figure 2:
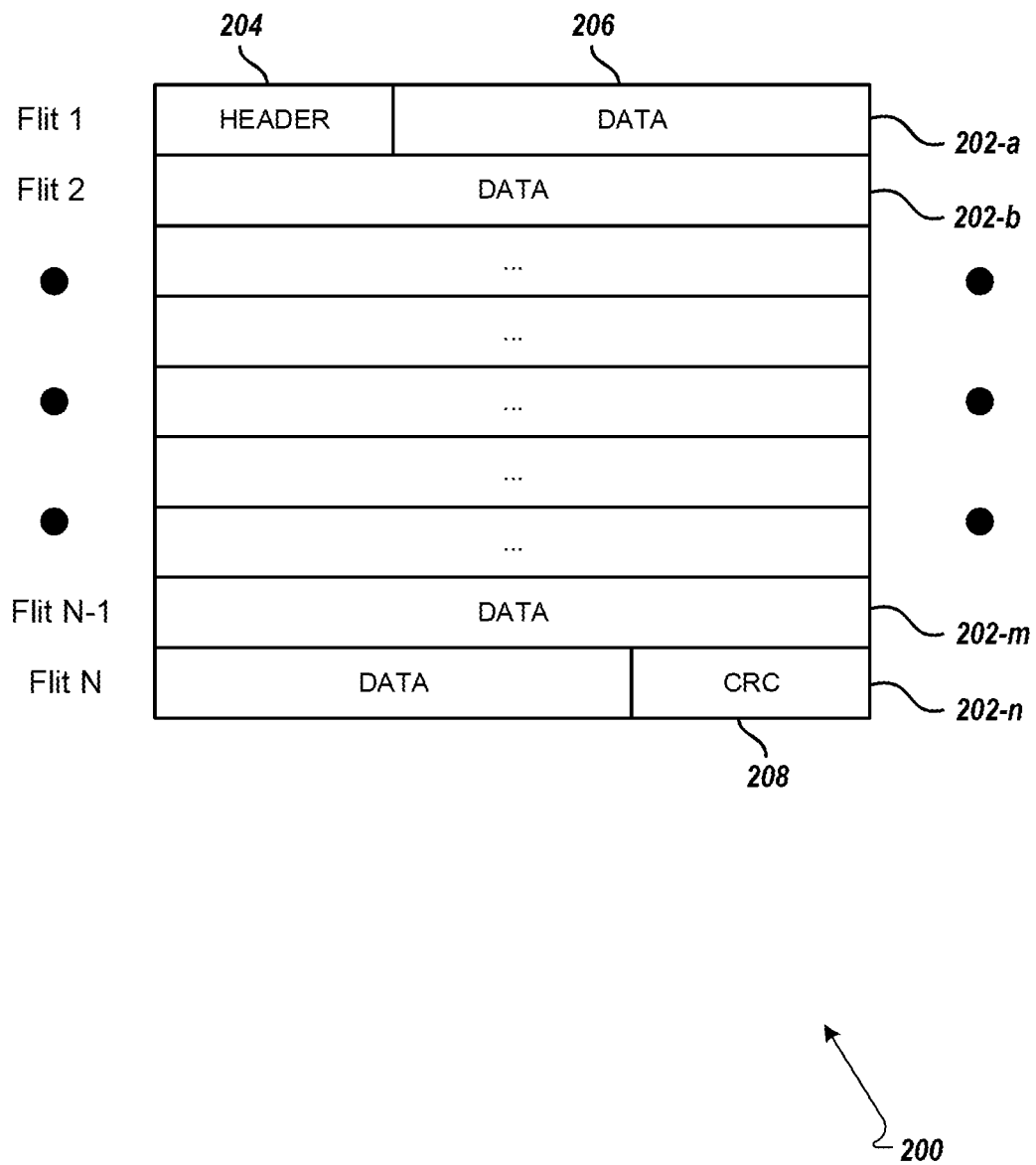
FIG. 2 illustrates an example frame communicated in a communication system, in accordance with at least some embodiments.

FIG. 2 illustrates an example frame 200 communicated in communication system 100 as described with reference to FIG. 1. For example, frame 200 can be transmitted by the transmitter 130 to the receiver 135 from either device 104-a to 104-b or from device 104-b to device 104-a. In an embodiment, frame 22 can include "N" flits 202. For example, a given frame 200 may include ten (10) flits 202. In some examples, each flit 202 may include a same quantity of bits—e.g., each flit 202 is "X" bits wide. For example, each flit 202 may be 128 bits wide. In some examples, the DL 110 of the transmitter 130 may transmit one (1) flit per each clock cycle. Accordingly, each frame may be transmitted in "N" clock cycles based on the "N" number of flits 202. Additionally, each frame 200 may include an error code CRC 208. The DL 110 is configured to generate the CRC 208 for the entire frame. In such embodiments, the DL 116 of the receiver 135 is configured to perform an error decode operation across the "N" flits 202 for each frame 200—e.g., the interrupt logic 150 is configured to perform one error decode operation after receiving "N" flits 202 corresponding to a size or width of the frame 200. That is, the error decode operation is performed at a frame granularity—e.g., a frame error rate (FER) is determined. In some embodiments, the frame 200 can include one (1) flit 202. In such embodiments, the error decode operation can essentially be performed at a flit granularity as each frame 200 includes one (1) flit 202. In some embodiments, the DL 110 of the transmitter 130 can generate a different error detection code—e.g., an error detection code other than CRC. For example, the DL 110 of the transmitter 130 can generate a parity check or a checksum. In either example, the error detection code selected by the transmitter 130 can be embedded within the frame 200 and transmitted to the DL 116 of the receiver 135. Each frame 200 may also include a header 204.

Figure 3:
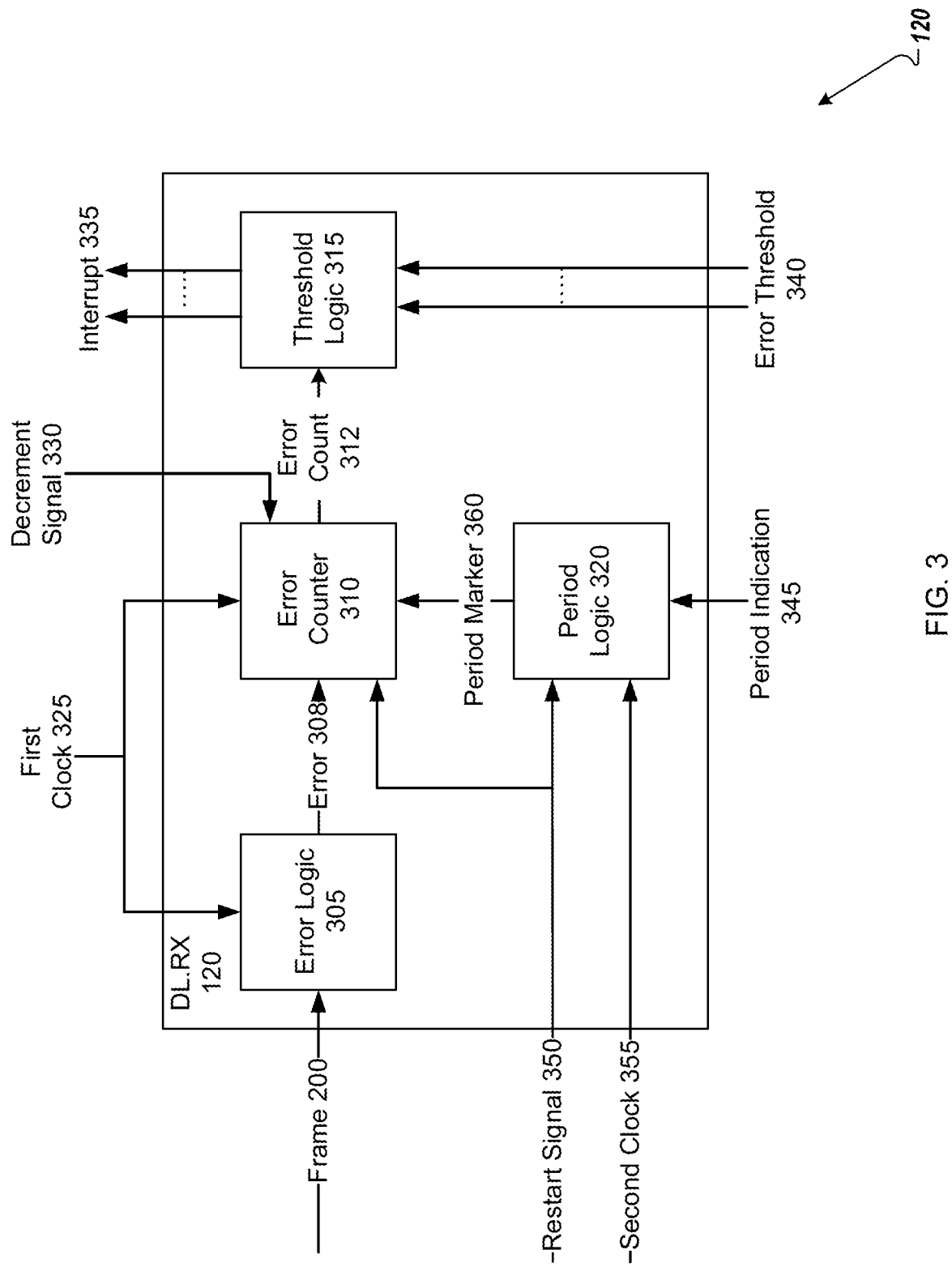
FIG. 3 is an example receiver employing a method for error rate interrupts in hardware, in accordance with at least some embodiments.

FIG. 3 illustrates an example data-link layer (DL) 120 of a receiver according to at least one example embodiment. In at least one embodiment, DL 120 is an example of DL 120 as described with reference to FIG. 1. The DL 120 can be in a receiver 135 as described with reference to FIG. 1. In an embodiment, the DL 120 can include error logic 305, an error counter 310, threshold logic 315, and period logic 320. In an embodiment, the components of the DL 120 can receive signals from a software stack—e.g., boot or run-time software, firmware, or other entities controlling the link and DL 120.

In some embodiments, error logic 305 can be configured to receive frame(s) 200. In an embodiment, error logic 305 can perform an error detection operation on the frame 200 received. For example, error logic 305 can perform CRC error detection using the CRC code embedded in frame 200 as described with reference to FIG. 2—e.g., use a portion of the bits of the frame to perform the error detection operation. In an embodiment, the error logic 305 can transmit an indication of an error 308 to the error counter 310. In an embodiment, the error logic 305 can be clocked by a first clock 325. In an embodiment, the first clock 325 can be the receiver's 135 clock. In an embodiment, the first clock 325 can be associated with a data or flit rate—e.g., associated with receiving frames 200.

In an embodiment, error counter 310 can be configured to count a number of errors 308—e.g., error counter 310 can store a value corresponding to the number of errors 308. For example, the error counter 310 can track a number of errors 308 determined by error logic 305 to determine an error count 312. In some embodiments, the error counter 310 can determine the error count 312 within a period. For example, the error counter 310 can receive a period marker 360 indicating when a period is over. In some embodiments, the error counter 310 can reset the error count 312 when a respective period is over e.g., when the decrement signal 330 is zero. In some embodiments, the error counter 310 can reduce the error count 312 when the respective period is over. For example, the error counter 310 can receive a decrement signal 330 from the software stack and reduce the error count 312 by a value indicated in the decrement signal 330—e.g., the error counter 310 can decrement the error count 312 by five (5) if the decrement signal 330 indicates a value five (5). That is, the error counter 310 can reset the error count 312 when the decrement signal has a value zero (0) or decrement the error count 312 by a value when the decrement signal 330 is a non-zero value. In some embodiments, the error counter 310 can decrement the error count 312 by a same value each time the period is over. In other embodiments, the error counter 310 can decrement the error count 312 by different values each the period is over based on the decrement signal 330. By decrementing the error count 312, the error counter 310 can track the number of errors 308 over a rolling period—e.g., the error count 312 is not reset after each period allowing the error count 312 to span across multiple periods. In some embodiments, the error counter 310 can reset the error count 312 based on receiving a restart signal 350. In an embodiment, the error counter 310 can be configured to send the error count 312 to threshold logic 315. In some embodiments, the error counter 310 can be clocked by the first clock 325. Additional details regarding the error counter 310 are described with reference to FIG. 4A.

In some embodiments, threshold logic 315 can compare the error count 312 (e.g., the value stored associated with the number of errors) with one or more error thresholds 340. In an embodiment, the software stack can program error threshold(s) 340 to the threshold logic 315. The threshold logic 315 can compare the error count 312 received with the programmed error thresholds 340. In some embodiments, the threshold logic 315 can be programmed with two (2) error thresholds 340. In such embodiments, a first error threshold 340 can be associated with a first interrupt 335 (e.g., a soft interrupt), and a second error threshold 340 can be associated with a second interrupt 335 (e.g., a hard interrupt). Accordingly, the threshold logic 315 can transmit the first interrupt 335 when the first error threshold 340 is satisfied (e.g., the error count 312 is the same as or exceeds the first error threshold 340) and transmit the second interrupt 335 when the second error threshold 340 is satisfied (e.g., the error count 312 is the same as or exceeds the second error threshold 340). In some embodiments, the software stack can take no actions when the soft interrupt is received. In other embodiments, the software stack can take actions to reduce the number of errors that occur when the soft interrupt is received—e.g., take preventative action. For example, the software stack can reduce the link rate (e.g., the speed at which the link operates), which can reduce the number of errors 308 that occur. In some embodiments, the software stack can reset or shut down a device (e.g., device 106) or retrain the link when the hard interrupt is received. In such embodiments, the second error threshold 340 is greater than the first error threshold 340.

In some embodiments, period logic 320 is configured to determine when a respective period is over. For example, period logic 320 can be programmed with a period via period indication 345 sent by the software stack. In an embodiment, the period logic 320 can be clocked by a second clock 355. In some embodiments, the second clock 355 can be independent of the first clock 325—e.g., independent of the data or flit rate. In some embodiments, the second clock 355 can be slower than the first clock 235—e.g., the second clock 355 can have a lower clock rate or clock speed than the first clock 325. In some embodiments, the second clock 355 can have a first frequency, and the first clock 325 can have a second frequency, where the first frequency is less than the second frequency. In some embodiments, period logic 320 can count a number of clocks that have elapsed since a last period is over. In such embodiments, the period logic 320 can generate a period marker 360 when the count of the number of clocks satisfies the programmed period (e.g., the period indication 345). That is, the period logic 320 can determine when a period is over and transmit the indication to the error counter 310. In some embodiments, the period logic 320 can receive a restart signal 350. In such embodiments, the period logic 320 can reset the count of the clocks and send the period marker 360 to the error counter 310—e.g., the period logic 320 can reset the period. Additional details regarding the error counter 310 are described with reference to FIG. 4B.

Figure 4A:
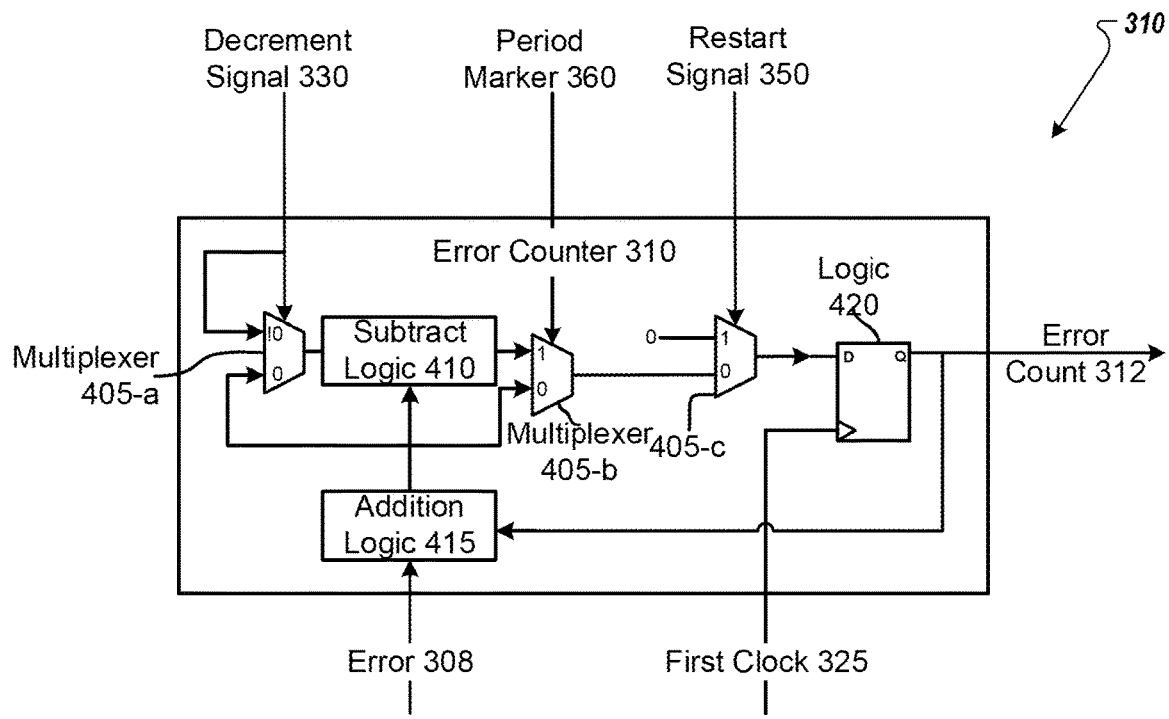
FIGS. 4A and 4B illustrate examples of an error counter and period logic for error rate interrupts in hardware, in accordance with at least some embodiments.

FIG. 4A illustrates an example error counter 310 as described with reference to FIG. 3. In some embodiments, the error counter 310 can be coupled with an error logic 305, threshold logic 315, and period logic 320 as described with reference to FIG. 3. In some embodiments, the error counter 310 can include multiplexer 405-a, multiplexer 405-b, multiplexer 405-c, subtract logic 410, addition logic 415, and logic 420. In an embodiment, the components of the error counter 310 can receive signals from a software stack—e.g., boot or run-time software, firmware, or other entities controlling the link and DL 120.

In some embodiments, error counter 310 is configured to determine an error count 312 (e.g., a value corresponding to a number of errors 308) within a specified period—e.g., a programmable period indicated by a software stack as described with reference to FIG. 3. For example, the error counter 310 can receive an indication of an error 308 from the error logic 305. Addition logic 415 can be configured to add one (1) to the error count 312 when the error 308 is received—e.g., increment the error count 312 (e.g., the value stored) each time an error 308 is received. In some embodiments, the addition logic 415 can be an example of an adder with an appropriate overflow policy. The addition logic 415 can be configured to send the error count 312 after adding one (1) to multiplexer 405-a, multiplexer 405-b, and subtraction logic 410.

In some embodiments, multiplexer 405-a is configured to receive the error count 312 from the addition logic 415. In some examples, multiplexer 405-a can receive the decrement signal 330 from the software stack. In some embodiments, the decrement signal 330 is a configuration value programmed by the software stack—e.g., a pseudo-static value that remains constant after programming. In some embodiments, the multiplexer 405-a can select either the decrement signal 330 or the error count 312 provided by addition logic 415 to output. For example, the multiplexer can select the error count 312 provided by the addition logic 415 when the decrement signal 330 has a value zero. In other examples, the multiplexer can select the decrement signal 330 when the decrement signal 330 has a non-zero value. Accordingly, the error count 312 is reset after a period is over unless the decrement signal 330 has the non-zero value.

In an embodiment, subtract logic 410 is configured to reduce the error count 312. In some embodiments, the subtract logic 410 can reset the error count 312 to zero (0) when the error counter 310 receives a period marker 360 and the decrement signal has a value of zero (0). In some embodiments, the subtract logic 410 can reduce the error count 312 by a value indicated by the decrement signal 330. For example, the subtract logic 410 can reduce the error count 312 by four (4) if the decrement signal 330 has a value four (4) and a period marker 360 is received. In other embodiments, the subtract logic 410 can reduce the error count 312 by a different value based on the value of the decrement signal 330. That is, the subtract logic 410 can reset the error count 312 when the multiplexer 405-a selects the error count 312 from addition logic 415 or decrement the error count 312 by a value when the multiplexer 405-a selects the decrement signal 330.

Multiplexer 405-b is configured to output the error count 312 to multiplexer 405-c. In an embodiment, multiplexer 405-b can output the error count 312 received from addition logic 415. In some embodiments, multiplexer 405-b can output the error count 312 or signal received from subtract logic 410. For example, the multiplexer 405-b can output the error count 312 from the subtract logic 410 when the period marker 360 is received—e.g., the error counter 310 can reduce the count to zero (0) or reduce the count by a value specified by the decrement signal 330 when the period marker 360 indicates the period is over.

Multiplexer 405-c is configured to output the error count 312 to logic 420. In an embodiment, the multiplexer 405-c can output the error count 312 received from multiplexer 405-b. In an embodiment, multiplexer 405-c can indicate to restart (e.g., reset) the error count 312 based on receiving a restart signal 350 from the software stack. For example, the software stack can determine to restart a period. In such embodiments, the multiplexer 405-c can receive the restart signal 350 and output it to the logic 420.

Logic 420 can be configured to latch the error count 312. In an embodiment, the logic 420 is an example of a delay flip flop (e.g., DQ flip flop). In such embodiments, logic 420 can output the error count 312 on each rising edge of the first clock 325 signal received. That is, the logic 420 can transmit the updated error count 312 each clock cycle to the threshold logic 315. Logic 420 can be configured to reset the error count 312 to zero (0) when the restart signal 350 is received.

Figure 4B:
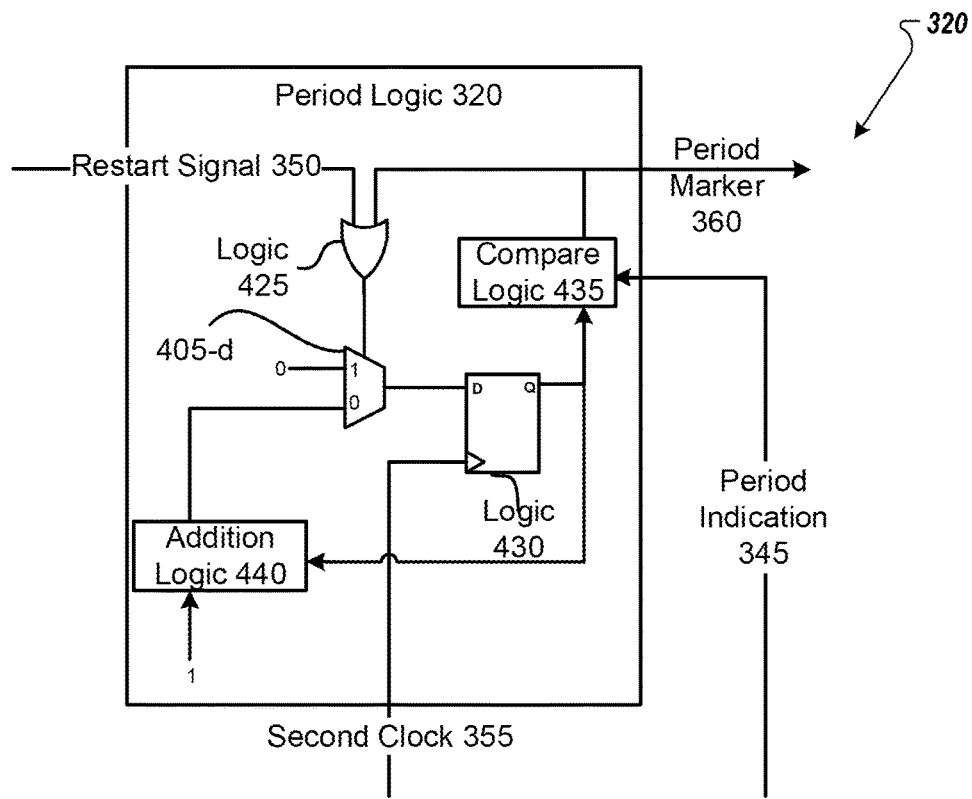

FIG. 4B illustrates an example period logic 320 as described with reference to FIG. 3. In some embodiments, the period logic 320 can be coupled with an error counter 310 as described with reference to FIG. 3. In some embodiments, the period logic 320 can include multiplexer 405-d, logic 425, compare logic 435, addition logic 440, and logic 430. In an embodiment, the components of the period logic 320 can receive signals from a software stack—e.g., boot or run-time software, firmware, or other entities controlling the link and DL 120.

In some embodiments, period logic 320 is configured to track periods for the error counter 310—e.g., track a programmable period indicated by a software stack as described with reference to FIG. 3. For example, the period logic 320 can receive a period indication 345 that indicates a programmable period from the software stack. In some embodiments, the period selected by the software stack can be based on characteristics of the link—e.g., based on a tolerable range of errors for the link. In at least one embodiment, period 320 can count a number of clock cycles of second clock 355 to determine whether a respective period has elapsed. For example, the second clock 355 signal can be outputted to the addition logic 440. The addition logic 440 can be configured to add one (1) to the number of clock cycles elapsed since a previous period elapsed. In some embodiments, the second clock 355 can be independent of the first clock 325. In at least one embodiment, the second clock 355 can have a slower clock rate or clock speed than the first clock 325. For example, the second clock 355 can have a programmable period of two or three hours.

In some embodiments, logic 430 can be configured to latch the count of the number of clock cycles elapsed. In at least one embodiment, logic 430 is configured to output the count every clock cycle of the second clock 355—e.g., output the count each rising edge of the second clock 355. In at least one embodiment, logic 430 can receive a restart signal 350 or a period marker 360. In either embodiment, logic 430 can reset the count of the number of clock cycles to zero—e.g., start tracking a new period.

In at least one embodiment, compare logic 435 is configured to compare the count of the number of clock cycles with the programmed period indicated by the period indication 345. In at least one embodiment, the compare logic 435 can reset the count (e.g., reduce the count) to zero (0)

when the count of the number of clock cycles satisfies (e.g., matches or exceeds) the programmable period—e.g., satisfies a number of clock cycles associated with the programmable period. Accordingly, the compare logic 435 can indicate the period is over, and the period logic 320 can transmit the period marker 360 to the error counter 310—e.g., indicate to the error counter 310 that the period elapsed.

Logic 425 can be configured to receive either restart signal 350 or period marker 360. For example, logic 425 can be an example of an OR gate. In such embodiments, logic 425 can send either restart signal 350 or period marker 360 to multiplexer 405-d. In an embodiment, multiplexer 405-d is to receive either the restart signal 350, the period marker 360, or the count of the number of clock cycles elapsed to logic 430. In some embodiments, the multiplexer 405-d outputs a value zero (0) when the restart signal 350 or the period marker 360 is received. Accordingly, period logic 320 can count a number of clock cycles elapsed and generate period marker 360 each time a period has elapsed.

Figure 5:
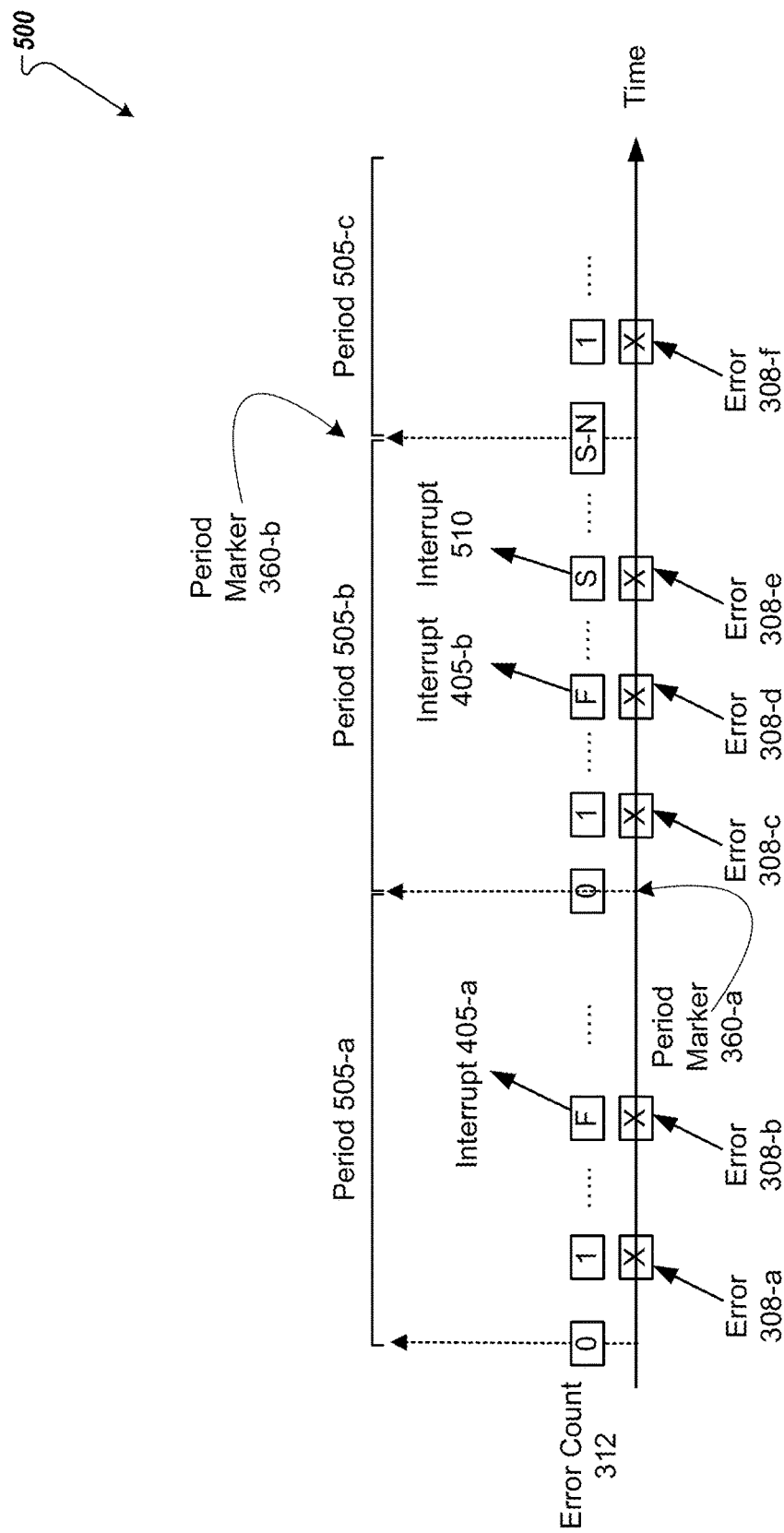
FIG. 5 is a timing diagram illustrating error rate interrupts in hardware, in accordance with at least some embodiments.

FIG. 5 illustrates a timing diagram 500 illustrating a process for error interrupt in hardware for a high-speed interconnect. The process illustrated can be performed by processing logic comprising hardware, software, firmware, or any combination thereof. In at least one embodiment, the process is performed by the DL 120 as described with reference to FIG. 3 e.g., by the error logic 305, error counter 310, threshold logic 315, and period logic 320. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other diagrams illustrating a process for error interrupt in hardware are possible.

In an embodiment, at a start of a period 505-a, an error count can be at 0. For example, error counter 310 can reset the error count 312 to zero (0) based on a period before period 505-a elapsing. In at least one embodiment, during period 505-a, the error logic 305 can receive frames 200 and perform an error detection operation on each frame 200 received. In some embodiments, the error logic 305 can determine an error occurred while receiving a frame 200. In such embodiments, the error logic 305 can transmit an indication of an error 308-a to the error counter 310. In some embodiments, the error counter 310 is configured to determine an error count 312 (e.g., store a value corresponding to a number of errors 308). For example, when the error logic 305 determines the error 308-a, the error counter 310 can increment the error count 312 by one (1). In some embodiments, the error counter 310 can send the error count 312 to threshold logic 315 each clock cycle of a first clock as described with reference to FIG. 4A. In such embodiments, the threshold logic 315 can compare the error count 312 with a first error threshold and a second error threshold as described with reference to FIG. 3. In at least one embodiment, the software stack can program the first and second error thresholds to the threshold logic 315. For example, the software stack can program a first error threshold of two (2) and a second error threshold of three (3). The software stack can select the error threshold based on a tolerable range of errors associated with the link. Additionally, during the period 505-a, the period logic 320 can count a number of second clocks elapsed to determine when period 505-a is over—e.g., compare the count of the second clocks elapsed with a programmed period. In at least one embodiment, the error logic 305 can determine an error 308-b, the error counter 310 can increment the count by one (1), and the threshold logic 315 can compare the error count 312 with the first error threshold. In at least one embodiment, the error count 312 after error 308-b can satisfy the first error threshold. In such embodiments, the threshold logic 315 can indicate an interrupt 405-a (e.g., a first interrupt or a soft interrupt) to the software stack. In some embodiments, the period logic 320 can determine a number of clock cycles elapsed satisfies the programmed threshold during period 505-a. In such embodiments, the period logic 320 transmits the period marker 360-a to the error counter 310. In some embodiments, the error counter 310 can reset the error count 312 to zero (0) based on receiving the period marker 360-a. In some embodiments, each period 505 can be three (3) hours. In other embodiments, the each period 505 can have a value larger than or smaller than three (3) hours.

During period 505-b, the error logic 305 can continue performing error detection operations on frames received 200. In such embodiments, the error counter 310 can determine the error count 312, and the threshold logic 315 can compare the error count 312 with the first error threshold and second error threshold. For example, the error logic 305 can determine an error 308-c, error 308-d, and error 308-e, and the error counter 310 can increment the error count 312 by one (1) each time the error 308 is determined during the period 505-b. In some embodiments, after error 308-d, the threshold logic 315 can determine that the error count 312 satisfies the first threshold. In such embodiments, the threshold logic 315 can transmit the interrupt 405-b to the software stack—e.g., transmit the soft interrupt to the software stack. In some embodiments, the software stack can take remedial actions after receiving the interrupt 405-b as described with reference to FIG. 3—e.g., slow down the link. In an embodiment, after error 308-e, the threshold logic 315 can determine that the error count 312 satisfies the second threshold. In such embodiments, the threshold logic 315 can transmit a second interrupt 510 to the software stack—e.g., transmit a hard interrupt to the software stack. In some embodiments, the software stack can shut down or restart device 106 or retrain the link after receiving the hard interrupt as described with reference to FIG. 3. In some embodiments, the period logic 320 can determine a number of elapsed second clocks during period 505-b. In at least one embodiment, the period logic 320 can determine the number of elapsed second clocks satisfy the programmable period 505-b. In such embodiments, the period logic 320 can send period marker 360-b to error counter 310. In one embodiment, the error counter 310 can receive a decrement signal 330 during the period 505-b. In such embodiments, the error counter 310 can reduce the error count 312 by a value indicated by the decrement signal 330. For example, the error counter 310 can decrement the error count 312 by a value "N." By reducing the error count 312 by a value instead of resetting it, the error counter 310 can determine the error count 312 over multiple periods 505. For example, part of the error count 312 is rolled into period 505-b (e.g., the count "S-N" is the initial count value for the period 505-c.

During operation 505-c, the error logic 305 can continue performing error detection operations, and the error counter 312 can increment the error count 312 accordingly. In some embodiments, the DL 120 can continue monitoring the errors over the periods as long as the link remains active—e.g., continue performing the process as described herein until the link is inactive. By raising an interrupt only if the error count 312 satisfies the first error threshold or the second error threshold within the period 505, the DL 120 can reduce the number of interrupts raised and improve the performance of the communication system.

Figure 6:
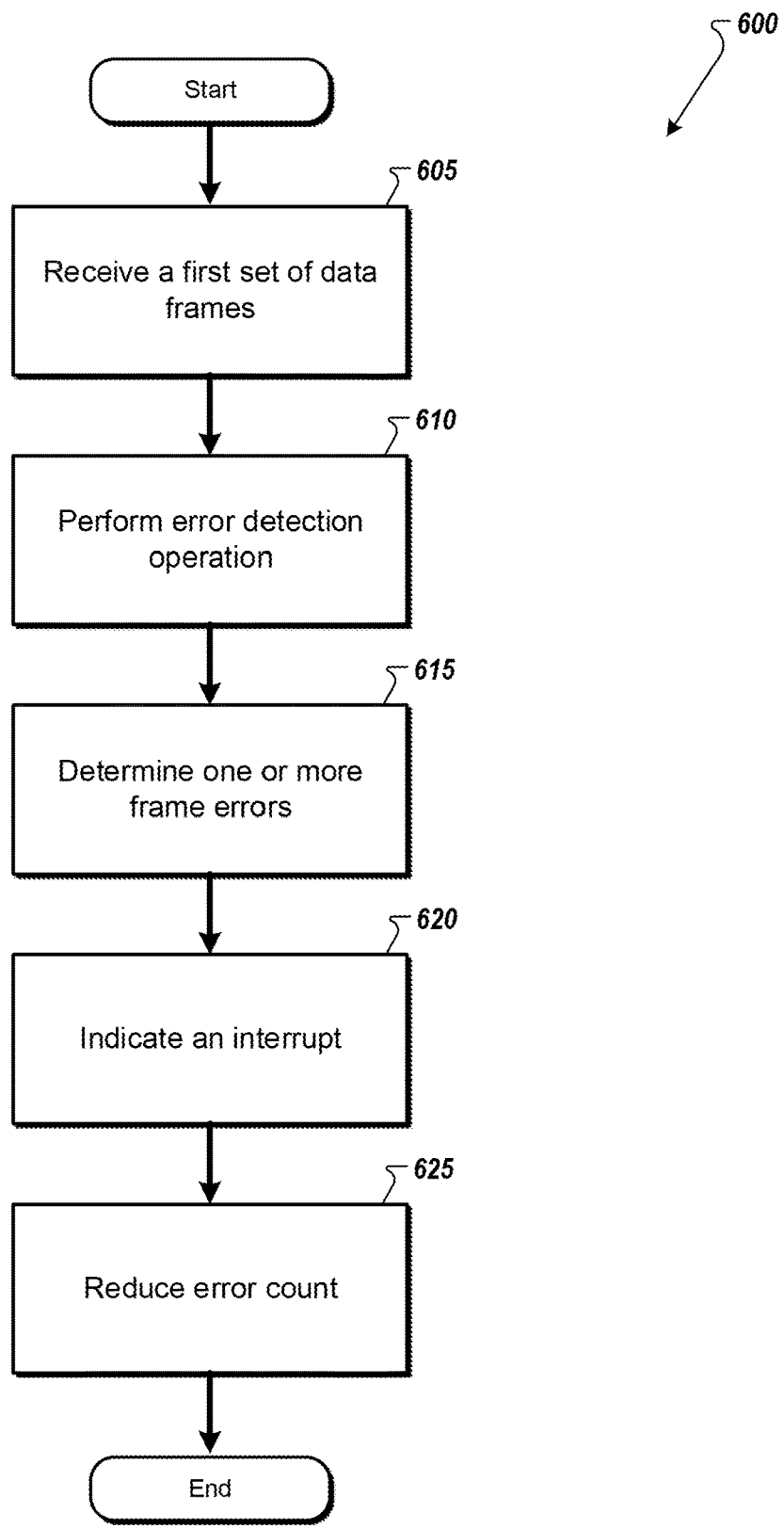
FIG. 6 is a flow diagram of a method for error interrupts in a high-speed interconnect system, in accordance with at least some embodiments.

FIG. 6 illustrates an example flow diagram of a method 600 for error rate interrupts in hardware for a high-speed interconnect. The method 600 can be performed by processing logic comprising hardware, software, firmware, or any combination thereof. In at least one embodiment, the method 600 is performed by the DL 120 as described with reference to FIG. 3—e.g., by the error logic 305, error counter 310, threshold logic 315, and period logic 320. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other diagrams illustrating a method for error rate interrupts in hardware are possible.

At operation 605, processing logic can receive a first set of data frames. For example, the error logic 305 can receive the first set of data frames as described with reference to FIG. 3. In at least one embodiment, the set of first set of data frames can be received at detection logic.

At operation 610, processing logic can perform an error detection operation on each data frame of the first set of data frames received. In an embodiment, the error logic 305 can perform an error detection operation on each data frame of the first set of data frames. In at least one embodiment, the error detection operation can be a CRC operation. In at least one embodiment, the error detection operation is performed using a portion of bits in each frame of the first set of frames as described with reference to FIG. 2. In an embodiment, each frame of the first set of frames includes a quantity of bits, the quantity of bits the same for each data frame.

At operation 615, the processing logic can determine one or more errors based on performing the error detection operation—e.g., one or more frame errors as described with reference to FIG. 3. In at least one embodiment, the processing logic can update a counter value, at a counter (e.g., error counter 310), to a first count value corresponding to a number of errors detected in response to performing the error detection operation on each data frame—e.g., the error counter can store the number of the one or more frame errors detected in the first set of data frames. For example, error counter 310 can increment the number of errors detected by one (1) each time an error is detected—e.g., each time a frame error is detected.

At operation 620, the processing logic can indicate an interrupt. For example, the threshold logic 315 can indicate an interrupt as described with reference to FIG. 3. In at least one embodiment, the processing logic can be an example of an interrupt logic coupled with the error counter. In at least one embodiment, the interrupt logic is to specify a period and compare the number of errors (e.g., the one or more frame errors) with a threshold number of errors (e.g., frame errors) during the period. In at least one embodiment, the interrupt logic can indicate the interrupt responsive to the number of errors (e.g., one or more frame errors) detected within the period satisfying the threshold number of frame errors. In at least one embodiment, the interrupt logic includes a comparison logic to compare the number of one or more frame errors at the error counter with the threshold number of frame errors during the period. In an embodiment, the threshold number of errors is programmable. In such embodiments, the interrupt logic is to select the threshold number of frame errors from a plurality of threshold number of frame errors. In some embodiments, a time period logic is to transmit a signal to the error counter to specify the period—e.g., the period logic 320 can indicate a period marker 360 to the error counter 310 to indicate the end of a period. For example, the counter can receive a signal after a period of time associated with a clock cycle of a logic device—e.g., the second clock 355. In some embodiments, the period can be programmable. In such embodiments, the interrupt logic can select the period from a plurality of time periods. In at least one embodiment, the interrupt logic can specify the period corresponding to a first clock having a first frequency, where the first frequency is less than a second clock of the receiver having a second frequency greater than the first frequency—e.g., the second clock 355 can be a slower clock than the first clock 325 as described with reference to FIG. 3. In some embodiments, the interrupt logic can compare the number of errors detected (e.g., the one or more frame errors) with a second threshold number of errors (e.g., a second threshold number of frame errors) responsive to the number of errors detected within the period satisfying the threshold number of frame errors. In such embodiment, the interrupt logic can indicate a second interrupt responsive to the errors detected satisfying the second threshold number of errors. In some embodiments, the interrupt is associated with a soft interrupt, and the second interrupt is associated with a hard interrupt, as described with reference to FIG. 3. For example, the first interrupt is processed by a first software interrupt handler and the second interrupt is processed by a second software interrupt handler. In some embodiments, the first software handler and the second software handler are the same. In at least one embodiment, the first software handler can slow down a link coupled to the receiver device in response to receiving the first interrupt. In at least one embodiment, the second software handler can restart the receiver device or restart the link in response to receiving the second interrupt.

At operation 635, the processing logic can reduce the error count (e.g., the first count) to a second count value in response to receiving a signal indicating the end of the period. For example, the processing logic can reduce the first count value to zero (0)—e.g., the second count value is a reset value. In other embodiments, the processing logic can reduce the first count by a value indicated by a decrement signal (e.g., decrement signal 330 as described with reference to FIG. 3) to get to the second count value. In at least one embodiment, the processing logic can continue performing error detection operations, determining the error count, and raising the interrupts if the error count satisfies the first error threshold or the second error threshold as described with reference to operations 605-635. For example, the processing logic can receive a second set of data frames and perform the error detection operation on each data frame of the second set of data frames. In such embodiments, the processing logic can update the counter to a third value and compare the third value with the threshold number of errors and the second threshold number of errors. If the processing logic determines that the third count satisfies the threshold number of errors but fails to satisfy the second threshold number of errors, the processing logic can transmit an indication that the third count satisfies the threshold number of errors, the indication associated with the soft interrupt. If the processing logic determines the third count satisfies the second threshold number of errors, the processing logic can transmit an indication that the third count value satisfies the second threshold number of errors, the indication associated with the hard interrupt. In some embodiments, the processing logic can receive a reset signal after performing the error detection operation on the second set of frames. In such embodiments, the processing logic can update the counter value to a reset value (e.g., zero). In some embodiments, the processing logic can adjust the period of time to a second period of time different than the period of time. In such embodiments, the processing logic can receive a second signal after the second period of time elapses.

Figure 7:
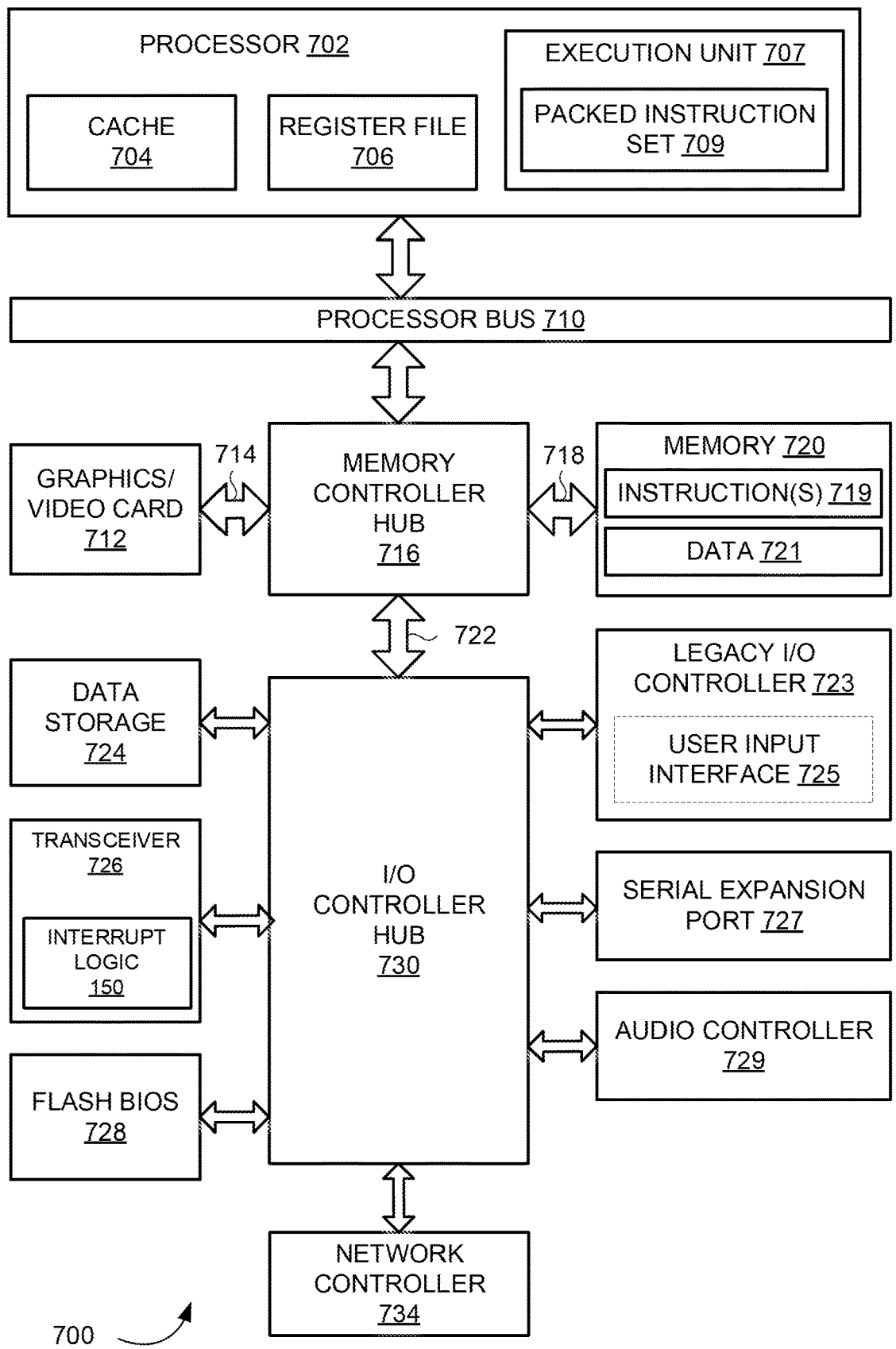
FIG. 7 illustrates an example computer system including a transceiver including a chip-to-chip interconnect for error rate interrupts in hardware, in accordance with at least some embodiments.

FIG. 7 illustrates a computer system 700 including a transceiver including a chip-to-chip interconnect, in accordance with at least one embodiment. In at least one embodiment, computer system 700 may be a system with interconnected devices and components, an SOC, or some combination. In at least one embodiment, computer system 700 is formed with a processor 702 that may include execution units to execute an instruction. In at least one embodiment, computer system 700 may include, without limitation, a component, such as processor 702, to employ execution units including logic to perform algorithms for processing data. In at least one embodiment, computer system 700 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 700 may execute a version of WINDOWS' operating system available from Microsoft Corporation of Redmond, Wash., although other operating systems (UNIX and Linux for example), embedded software, and/or graphical user interfaces may also be used.

In at least one embodiment, computer system 700 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 700 may be used in devices such as graphics processing units (GPUs), network adapters, central processing units and network devices such as switch (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 700 may include, without limitation, processor 702 that may include, without limitation, one or more execution units 707 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 700 is a single-processor desktop or server system. In at least one embodiment, computer system 700 may be a multiprocessor system. In at least one embodiment, processor 702 may include, without limitation, a CISC microprocessor, a RISC microprocessor, a VLIW microprocessor, a processor implementing a combination of instruction sets, or any other processor device, such as a digital signal processor, for example. In at least one embodiment, processor 702 may be coupled to a processor bus 710 that may transmit data signals between processor 702 and other components in computer system 700.

In at least one embodiment, processor 702 may include, without limitation, a Level 1 ("L1") internal cache memory ("cache") 704. In at least one embodiment, processor 702 may have a single internal cache or multiple levels of internal cache. In at least one embodiment, cache memory may reside external to processor 702. In at least one embodiment, processor 702 may also include a combination of both internal and external caches. In at least one embodiment, a register file 706 may store different types of data in various registers including, without limitation, integer registers, floating point registers, status registers, and instruction pointer register.

In at least one embodiment, execution unit 707, including, without limitation, logic to perform integer and floating point operations, also resides in processor 702. Processor 702 may also include a microcode ("ucode") read only memory ("ROM") that stores microcode for certain macro instructions. In at least one embodiment, execution unit 707 may include logic to handle a packed instruction set 709. In at least one embodiment, by including packed instruction set 709 in an instruction set of a general-purpose processor 702, along with associated circuitry to execute instructions, operations used by many multimedia applications may be performed using packed data in a general-purpose processor 702. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 700 may include, without limitation, a memory 720. In at least one embodiment, memory 720 may be implemented as a DRAM device, an SRAM device, flash memory device, or other memory device. Memory 720 may store instruction(s) 719 and/or data 721 represented by data signals that may be executed by processor 702.

In at least one embodiment, a system logic chip may be coupled to processor bus 710 and memory 720. In at least one embodiment, the system logic chip may include, without limitation, a memory controller hub ("MCH") 716, and processor 702 may communicate with MCH 716 via processor bus 710. In at least one embodiment, MCH 716 may provide a high bandwidth memory path 718 to memory 720 for instruction and data storage and for storage of graphics commands, data and textures. In at least one embodiment, MCH 716 may direct data signals between processor 702, memory 720, and other components in computer system 700 and to bridge data signals between processor bus 710, memory 720, and a system I/O 722. In at least one embodiment, a system logic chip may provide a graphics port for coupling to a graphics controller. In at least one embodiment, MCH 716 may be coupled to memory 720 through high bandwidth memory path 718, and graphics/video card 712 may be coupled to MCH 716 through an Accelerated Graphics Port ("AGP") interconnect 714.

In at least one embodiment, computer system 700 may use system I/O 722 that is a proprietary hub interface bus to couple MCH 716 to I/O controller hub ("ICH") 730. In at least one embodiment, ICH 730 may provide direct connections to some I/O devices via a local I/O bus. In at least one embodiment, a local I/O bus may include, without limitation, a high-speed I/O bus for connecting peripherals to memory 720, a chipset, and processor 702. Examples may include, without limitation, an audio controller 729, a firmware hub ("flash BIOS") 728, a transceiver 726, a data storage 724, a legacy I/O controller 723 containing a user input interface 725 and a keyboard interface, a serial expansion port 727, such as a USB, and a network controller 734. Data storage 724 may comprise a hard disk drive, a floppy disk drive, a CD-ROM device, a flash memory device, or other mass storage device. In an embodiment, the transceiver 726 includes a constrained FFE 708.

In at least one embodiment, FIG. 7 illustrates a system, which includes interconnected hardware devices or "chips" in the transceiver 726—e.g., the transceiver 726 includes a chip-to-chip interconnect including the first device 104-*a* and second device 104-*b* as described with reference to FIG. 1). In at least one embodiment, FIG. 7 may illustrate an exemplary SoC. In at least one embodiment, devices illustrated in FIG. 7 may be interconnected with proprietary interconnects, standardized interconnects (e.g., PCIe), or some combination thereof and utilize a GRS link 220 as described with reference to FIG. 2. In at least one embodiment, one or more components of system 700 are interconnected using compute express link ("CXL") interconnects. In an embodiment, the transceiver 726 can include interrupt logic 150 as described with reference to FIG. 1. In such embodiments, the interrupt logic 150 can transmit a first interrupt if a detected number of errors satisfies a first threshold number of errors within a programmable period. In some embodiments, the interrupt logic 150 can transmit a second interrupt if the detected number of errors satisfies a second threshold number of errors within the programmable period. Accordingly, the interrupt logic 150 can facilitate a method for error rate interrupts in hardware for a high-speed interconnect.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously, or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A receiver device comprising:
   detection logic to detect frame errors in data frames received by a transmitter device;
   error counter logic coupled to the detection logic, wherein the error counter logic is to:
      increment a first value of an error count responsive to each error signal, indicative of a frame error in a data frame, received from the detection logic;
      reduce the first value to a second value for the error count responsive to receiving a decrement signal and a period marker signal corresponding to a programmable period, wherein the second value is a non-zero value; and
      reset the first value or the second value of the error count to zero responsive to receiving a reset signal; and
   threshold logic coupled to the error counter logic, the threshold logic to compare a current value of the error count with a threshold number of frame errors and output an interrupt responsive to the current value satisfying the threshold number of frame errors.

2. The receiver device of claim 1, wherein the error counter logic comprises:
   subtraction logic to reduce the first value to the second value responsive to receiving the decrement signal and the period marker signal;
   addition logic to increment the current value of the error count each error signal received from the detection logic; and
   a latch to store the current value of the error count.

3. The receiver device of claim 2, wherein the latch and the detection logic are clocked by a first clock.

4. The receiver device of claim 3, further comprising:
   time period logic coupled to the error counter logic, the time period logic to receive a second clock and an indication of the programmable period, the time period logic to output the period marker signal at an end of each programmable period.

5. The receiver device of claim 1, further comprising:
   time period logic coupled to the error counter logic, the time period logic to receive a clock and an indication of the programmable period, the time period logic to output the period marker signal at an end of each programmable period.

6. The receiver device of claim 5, wherein the time period logic is further to select the programmable period from a plurality of time periods.

7. The receiver device of claim 1, wherein the threshold logic is further to select the threshold number of frame errors from a plurality of threshold number of frame errors.

8. A receiver device comprising:
  detection logic to detect frame errors in data frames received by a transmitter device;
  an error counter to store an error count; and
  interrupt logic coupled to the error counter, the interrupt logic to specify a programmable period, the interrupt logic to:
    increment a first value of the error count responsive to each error signal, indicative of a frame error in a data frame, received from the detection logic;
    reduce the first value to a second value for the error count responsive to receiving a decrement signal and a period marker signal corresponding to a programmable period, wherein the second value is a non-zero value;
    reset the first value or the second value of the error count to zero responsive to receiving a reset signal; and
    compare a current value of the error count with a threshold number of frame errors and output an interrupt responsive to the current value satisfying the threshold number of frame errors.

9. The receiver device of claim 8, wherein the interrupt logic is further to:
  compare the current value of the error count with a second threshold number of frame errors; and
  output a second interrupt responsive to the current value satisfying the second threshold number of frame errors.

10. The receiver device of claim 8, wherein the interrupt logic is further to specify the programmable period corresponding to a first clock having a first frequency, and wherein the receiver device is to receive the data frames using a second clock having a second frequency greater than the first frequency.

11. A device comprising:
  a data link (DL) receiver, a logic device, and a counter, the device to:
    receive data frames;
    perform an error detection operation on each data frame;
    update a counter value, at the counter, to a first count value corresponding to a number of errors detected in response to performing the error detection operation on each data frame;
    receive a period marker signal, at the counter from the logic device, at an end of a programmable period;
    reduce the first count value to a second count value responsive to receiving a decrement signal and the period marker signal, wherein the second count value is a non-zero count value;
    reset the first count value or the second count value to zero responsive to receiving a reset signal; and
    output a first interrupt responsive to the first count value or the second count value satisfying a threshold number of errors.

12. The device of claim 11, wherein the device is further to:
  receive additional data frames;
  perform the error detection operation on each data frame of the additional data frames;
  update the counter value, at the counter, to a third count value in response to performing the error detection operation on each data frame of the additional data frames; and
  output the first interrupt responsive to the third count value satisfying the threshold number of errors.

13. The device of claim 11, wherein the device is further to:
  receive additional data frames;
  perform the error detection operation on each data frame of the additional data frames;
  update the counter value, at the counter, to a third count value in response to performing the error detection operation on each data frame of the additional data frames; and
  output a second interrupt responsive to the third count value satisfying a second threshold number of errors, the second threshold number of errors being greater than the threshold number of errors.

14. The device of claim 11, wherein the device is further to:
  adjust the programmable period from a first period of time to a second period of time different than the first period of time; and
  receive a second period marker signal, at the counter from the logic device, at an end of a programmable period corresponding to the second period of time.

15. A method comprising:
  receiving, at a device comprising a counter and a logic device, data frames;
  performing, at the device, an error detection operation on each data frame;
  updating, at the counter, a counter value to a first count value corresponding to a number of errors detected in response to performing the error detection operation on each data frame;
  receiving, at the counter, a period marker signal from the logic device at an end of a programmable period;
  reducing the first count value to a second count value responsive to receiving a decrement signal and the period marker signal, wherein the second count value is a non-zero count value;
  resetting the first count value or the second count value to zero responsive to receiving a reset signal; and
  outputting a first interrupt responsive to the first count value or the second count value satisfying a threshold number of errors.

16. The method of claim 15, further comprising:
  receiving additional data frames;
  performing the error detection operation on each data frame of the additional data frames;
  updating the counter value, at the counter, to a third count value in response to performing the error detection operation on each data frame of the additional data frames; and
  outputting the first interrupt responsive to the third count value satisfying the threshold number of errors.

17. The method of claim 15, further comprising:
  receiving additional data frames;
  performing the error detection operation on each data frame of the additional data frames;
  updating the counter value, at the counter, to a third count value in response to performing the error detection operation on each data frame of the additional data frames; and outputting a second interrupt responsive to the third count value satisfying a second threshold number of errors, the second threshold number of errors being greater than the threshold number of errors.

18. The method of claim 15, further comprising:
adjusting the programmable period from a first period of time to a second period of time different than the first period of time; and
receiving a second period marker signal, at the counter from the logic device, at an end of a programmable period corresponding to the second period of time.

19. The method of claim 15, wherein the period marker signal specifies the end of the programmable period corresponding to a first clock having a first frequency, and wherein the device comprises a second clock having a second frequency greater than the first frequency.

20. The method of claim 15, further comprising:
outputting a second interrupt responsive to the first count value of the second count value satisfying a second threshold number of errors, the second threshold number of errors being greater than the threshold number of errors.

* * * * *